United States Patent [19]

Budinger et al.

[11] Patent Number: 4,927,432
[45] Date of Patent: May 22, 1990

[54] PAD MATERIAL FOR GRINDING, LAPPING AND POLISHING

[75] Inventors: William D. Budinger, Kennett Square, Pa.; Elmer W. Jensen, Wilmington, Del.

[73] Assignee: Rodel, Inc., Newark, Del.

[21] Appl. No.: 843,881

[22] Filed: Mar. 25, 1986

[51] Int. Cl.$^5$ ................................................ C09B 3/14
[52] U.S. Cl. .......................................... 51/298; 51/296; 427/389.9; 428/280; 428/281; 428/283; 428/289; 428/290; 428/300
[58] Field of Search ............... 428/280, 281, 287, 290, 428/300, 283, 289; 525/457, 458, 462, 452, 453; 427/389.9; 51/296, 298

[56] References Cited

U.S. PATENT DOCUMENTS

| | | | |
|---|---|---|---|
| 2,958,593 | 11/1960 | Hoover et al. | 51/295 |
| 2,972,554 | 2/1961 | Muskat et al. | 117/76 |
| 3,067,482 | 12/1962 | Hollowell | 28/74 |
| 3,475,525 | 10/1969 | Peters | 264/101 |
| 3,499,250 | 3/1970 | Jensen et al. | 51/109 |
| 3,504,457 | 4/1970 | Jacobsen et al. | 51/131 |
| 3,619,149 | 11/1971 | Kitazawa | 51/295 |
| 3,708,362 | 1/1973 | Winchcombe et al. | 156/82 |
| 3,865,661 | 2/1975 | Hata et al. | 156/79 |
| 3,915,671 | 10/1975 | Kagawa | 51/296 |
| 4,011,063 | 3/1977 | Johnston | 51/295 |
| 4,226,602 | 10/1980 | Fukuda | 51/296 |
| 4,486,200 | 12/1984 | Heyer et al. | 51/295 |
| 4,708,891 | 11/1987 | Ito et al. | 427/245 |

FOREIGN PATENT DOCUMENTS 1152165  5/1967  United Kingdom .

*Primary Examiner*—James J. Bell
*Attorney, Agent, or Firm*—Panitch Schwarze Jacobs & Nadel

[57] ABSTRACT

An improved polishing pad material is produced by modifying conventional poromeric materials in which a porous thermoplastic resin matrix, typically polyurethane, is reinforced with a fibrous network such as a felted mat of polyester fibers. The polishing material is modified by coalescing the resin among the fibers, preferably by heat treatment, to increase the porosity and hardness of the material as well increasing the surface activity of the resin. The polishing material may also incorporate polishing aids such as particulate abrasives and may also be used as a lapping or grinding material.

19 Claims, 1 Drawing Sheet

PAD MATERIAL FOR GRINDING, LAPPING AND POLISHING

FIELD OF THE INVENTION

This invention relates to improved materials which can be used for the grinding, lapping and polishing of semiconductor wafers and similar materials which require ultra high precision geometries.

BACKGROUND OF THE INVENTION

U.S. Pat. Nos. 3,504,457 and 3,499,250 describe the use of poromeric materials, specifically polyurethane reinforced by polyester fiber, for the polishing of semiconductor wafers. In the years since these patents were issued, the described materials have become the generally accepted standard for preparing the surface of silicon wafers.

Silicon wafers are the substrates upon which electronic devices known as integrated circuits are built. Typically, ingots of monocrystalline silicon are sliced into thin wafers 0.015 to 0.025 inches thick. The wafers are then usually lapped to make them flat and subsequently chemically etched. After etching, the wafers are subjected to a process known in the industry as polishing. Machines used for polishing are similar to machines used for lapping. In the polishing process, wafers are affixed to the polishing machine and then brought into rubbing contact with one or more poromeric materials which have been adhered to the rotating lapping plate. During the polishing process, the poromeric pad material is kept saturated with an alkaline suspension containing fine particles of silica. The alkaline suspension (slurry) reacts chemically with the silicon atoms on the surface of the wafer to produce a reaction product which is somewhat softer than the underlying silicon. Once the reaction product has formed on the wafer surface, further reaction is inhibited. During the polishing process, the reaction product is continually wiped away causing fresh silicon to be exposed to the effects of the slurry.

The function of the polishing pad is to act both as a carrier of the slurry and as a wipe to effect the removal of the reaction product from the wafer surface. It can be easily understood that the final shape or geometry of the wafer surface will be greatly affected by the manner in which the polishing pad exposes fresh silicon for reaction. Areas of the wafer in firmest contact with the pad will be wiped most vigorously and thus react most quickly. In these areas, silicon material will appear to be "polished away" most rapidly. If, for example, the pad is relatively soft and compliant, it will conform more easily to the wafer's contours and produce a softer ultimate shape with rounded edges. If, on the other hand, the pad is very hard, it will produce a flatter wafer with sharper edges.

At the time U.S. Pat. No. 3,504,457 was issued (Apr. 7, 1970), the state-of-the art required polished silicon wafers with rounded edges. The specified geometry of the polished wafer was several orders of magnitude less demanding than it is today. Further, the wafer polishing technology was still in the early stages of development and many different polishing techniques were used. Therefore, the requirement was for the soft, resilient polishing pads described in the above patents. Such soft pads made the polishing process relatively forgiving.

Recent developments in very large scale integrated circuit (VLSI) technology have brought much more stringent requirements for surface quality and the overall flatness and geometric precision of the wafer. Edge rounding is now accomplished by other means so that the function of the pad can be limited to creating as flat a surface as possible.

BRIEF SUMMARY OF THE INVENTION

According to the present invention, poromeric polishing pad materials are provided in which a fibrous mat or network is impregnated with a thermoplastic resin in such a manner as to leave pores in the resin, and subsequently coalescing the resin to increase the porosity and hardness of the pad material, as compared to prior art materials in which the resin matrix is not coalesced. The fiber network is preferably a felted mat of polyester fibers or other fibers having a softening point higher than the melting point of the resin, which is preferably a polyurethane. Polishing aids such as particulate abrasives may be incorporated into the pad material preferably prior to the coalescence of the resin. The materials may be used for lapping or grinding as well, but the term "polishing pad material" will be understood to refer to all three types of uses.

The pad materials of the invention may be made by precipitating the thermoplastic resin within the fiber network, preferably from a resin solution by a solvent - non-solvent coagulation process. The resin coalescing step is preferably accomplished by heating the material to a temperature and for a time insufficient to substantially soften the fibers but sufficient to coalesce the resin to a degree which increases the porosity and hardness of the material and decreases the number of microvoids in the resin. In a particularly preferred embodiment, the resin comprises at least two resins, one of which has a higher melting point than the other so that the higher melting point resin will not substantially coalesce during the heat treatment.

In addition to physically modifying the resin and pore structure, the coalescing treatment of the invention is believed to chemically modify the resin so as to alter its crystallinity and increase the chemical activity of the resin surface. As a result, the modified poromeric materials of the invention overcome deficiencies of the prior art and will generate the wafer geometries and surface qualities presently desired and which will be needed by future technology.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF PREFERRED EMBODIMENTS

Figure 1:
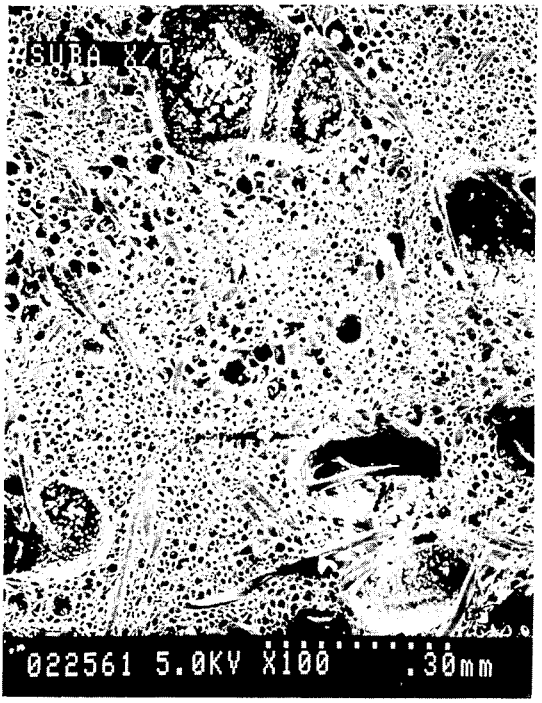
FIG. 1 is a photograph made at 5.0 kilovolts and 100× magnification by a scanning electron microscope showing an unmodified poromeric material prior to the coalescing treatment of the present invention.

Although the above description of the polishing process is a good working approximation, the actual mechanism of polishing is not completely understood. Over the last 15 years, the process has been studied extensively, and some conclusions can be drawn about the way various properties of a poromeric polishing pad affect the polishing process. Although the term "poromeric" has often been used in the sense of porous to gas but not to liquids, as used in the polishing industry and in this application the term "poromeric" is used more broadly to include porosity to liquids so that the poromeric materials can hold and deliver the polishing slurry to the wafer surface. The following generalizations can be made about the interaction in a polishing environment of several important properties of the pad material:

Hardness or Compression Modulus (as measured by a Shore gauge or compression tester) controls the degree to which the pad material will deform when subjected to polishing pressure. Increasing the hardness tends to increase the flatness of the finished wafer. Increasing hardness also can increase the polishing rate. However, harder pads are very unforgiving and require much more carefully prepared wafers. Without proper wafer preparation, harder pads produce more edge chipping and surface scratching. Another effect of hardness has to do with the phenomenon of glazing. Glazing occurs when silica and reaction product build up on the surface of the pad. A glazed pad will not polish. Soft pads tend to flex under polishing loads which can aid in breaking up the glaze. Also, the repeated compression which occurs under polishing loads tends to cause a softer pad to more readily "pump" slurry in and out of the pad pores thereby helping to keep the pad surface clean as well as presenting a supply of "fresh" slurry.

Porosity (as measured by the pressure required to force air through the poromeric) is important to the dissipation of heat and, as mentioned above, to the ability of the pad to continuously flush itself clean and present fresh slurry during the polishing operation. Insufficient porosity will cause a pad to overheat and glaze easily. Excessive porosity will tend to reduce polishing rate, probably because of insufficient localized heating and reduced contact area between the fiber reinforced resin and the wafer.

Internal Surface Area (often referred to as pore structure) refers to the overall surface area of the poromeric's fiber and resin structure as seen from the working face of the pad. This surface area is formed by convolutions in the resin structure as well as pores, open air pockets, voids or microvoids present in the resin formation. Internal surface area greatly affects a pad's ability to hold slurry and force the slurry up against the wafer surface. Altering the internal surface area or pore structure of a pad greatly affects polishing characteristics. Even so, there are no known objective measurements of this property that can be shown to reliably relate to polishing performance.

Resin Chemistry undoubtedly plays an important part in the polishing process. In a manner not well understood, the chemical surface activity of the resin seems to affect the pad's ability to wipe reaction product uniformly from the surface of a wafer without damaging the underlying silicon.

In order to improve polishing characteristics for today's more stringent geometric requirements, a resin impregnated polishing material may be modified either during its manufacture or after. The purpose of such treatments is to increase hardness, increase porosity, and alter the resin chemistry—all while minimizing reduction in the internal surface area. Thus, the coalescence of the resin according to the present invention reduces the number of microvoids and therefore the internal surface area, but at the same time increases porosity, presumably due to increasing the proportion of open cells or pores as opposed to closed cells or voids.

Most of the poromerics used for polishing are made by the solvent-nonsolvent coagulation process such as described in U.S. Pat. No. 3,067,482. In that process, a resin, typically urethane, is dissolved in N,N-dimethyl formamide (DMF), impregnated into a mat or network of felted fibers and subsequently coagulated in water. In its coagulated form, the resin tends to be highly poromeric and feels substantially softer than in its native form. The desired combination of properties for the present invention can be obtained by (1) selecting the proper resins, (2) coagulating the resins in a suitable fiber structure, (3) washing and drying the resultant material, and (4) briefly raising the material to a temperature which will cause the resins to modify their structure, melt and coalesce into a harder, more porous structure.

Because of the many unknowns that remain in the polishing process, there are no established rules which will guarantee the selection of the proper resin. The selection of any resin must ultimately be confirmed by polishing tests. Polyurethane resins of both the polyester and polyether type have been successfully used. Examples of other resins useful in the present invention include formalized polyvinyl alcohol, polycarbonate and polyureas.

By a proper selection of melting points, pad structures can be formed which optimize the desired properties. Resin melting points must be low enough to allow heat induced coalescing, preferably without altering the fiber network structure, but not so low as to permit significant softening under the heat generated during polishing. Resins with melting points in the 300–400 degree Fahrenheit range have been found quite suitable.

Although many fiber types can be used successfully, polyester fiber structures are the most commonly used in materials for polishing. Fine felted structures of polyester fibers form an excellent network for coagulation. Polyester fibers also have a softening temperature high enough so that the heat used to coalesce the resin will not substantially soften or melt the fibers.

The washing step in producing a poromeric material for this invention is extremely important. Small amounts of residual DMF left behind in the coagulated resin will affect the resin characteristics during the coalescence step. Non-uniform residual DMF will lower melting points in an unpredictable way and cause spotty discoloration of the product.

Coalescing with heat is the most sensitive part of the process. Insufficient heat will leave the resin soft and fail to provide the required porosity and hardness. Excessive heat will degrade the resin and perhaps damage the resin/fiber structure.

The ambient atmosphere in which the pad materials are heat treated can also affect the pad's polishing characteristics. A simple method of heat treating is in a hot air oven or with a hot air knife. However, the use of reactive gas atmospheres can be used to impart special properties to the material, if desired. For example, dry nitrogen may be considered an inert atmosphere, while wet nitrogen and other gases with high humidity (including steam), may be thought of as reactive. Some resins, particularly some polyester polyurethanes will be adversely affected by steam, undergoing hydrolytic degredation. If the heating medium is a gas or liquid containing a reactive isocyanate, many resins such as the urethanes described herein will react and harden further. Generally, it is preferred to use air or an inert atmosphere unless special modifications of the resin are desired.

One of the production difficulties encountered in the heat treating step is determining the optimum heat treating temperature. Different batches of apparently identical resin will have different melt characteristics. These difficulties can be circumvented by using a combination of two or more resins with melting points separated by at least 10 to 15 degrees Celsius. A heat treating temperature is then selected that will soften and coalesce the lower melt point resin but not the higher. In such blends, relatively more of the lower melting point resin should be used as compared to the higher melting point resin. In this way, during heat treating, the higher melt point resin remains near its original structure thereby providing structural support while the lower melting point resin coalesces to provide ultimate strength and hardness in the finished pad.

Another method of modifying the coalescing properties of the resin is to incorporate small amounts of plasticizer (such as dioctyl phthalate (DOP)) or non-water-miscible solvent (such as toluol) in the coagulation resin. Such additives tend to lower melting points and allow the use of resins with melting points that would otherwise be too high. If the heating process ultimately drives off the additive (as it does with toluol), the end effect is to create a very hard pad that will withstand unusually high operating temperatures.

Although the preferred method of coalescing the resin among the fibers of the fibrous network is by heating to soften and at least partially melt the resin, other coalescing treatments are possible within the scope of the present invention. For example, the resin matrix could be treated with a solvent which partially dissolves the matrix, causing the resin to run together and thereby eliminating many of the microvoids. Other possibilities, such as possibly irradiation or ultrasonics, will be apparent to those skilled in polymer chemistry in view of the present disclosure. Such other methods may have the effect of essentially lowering the melting point of the resin to room temperature so that flow of the resin occurs.

Another useful aspect of this invention can be achieved by impregnating the pad material with polishing aids or abrasives after creation of the poromeric but prior to the coalescing step. During the heat treating process, these mechanically placed polishing aids will interact with the poromeric material, thereby modifying its structure and properties. It is probable that this unique method of introducing abrasives creates special properties in the pad because the abrasive grains tend to be held on the outside of each resin globule. Conventional methods of incorporating abrasives, such as mixing the abrasives into the resin prior to coagulation, cause the abrasive particles to be buried in the interior of or occluded by the resin and thus unavailable for their intended purpose.

For example, saturating a poromeric with a 35% by weight dispersion of colloidal silica, precipitating the silica, drying and then heat treating produces a material with polishing properties which have been found to be very useful in the finishing of metallurgical test samples and aluminum memory discs for computers. Similarly, impregnating the poromeric material with silicon carbide, cerium oxide, titanium dioxide, diamond, or other abrasive prior to heat treating makes a pad that works very well as an abrasive grinding pad when used in a lapping or grinding operation. Grinding and lapping differ from polishing in that abrasion is performed directly on the workpiece material (rather than on the reaction product). In grinding, the abrasive is fixed in the pad. Lapping typically includes a slurry of loose abrasive which may be in addition to or in place of fixed abrasive. In either case, abrasive loaded pads made by this invention offer a significant advantage over conventionally made pads.

While applicant does not wish to be bound by any particular theory, it is believed that some of the improved performance of the heat treated pads may be due to the effect of the heat treatment on the chemistry of the resin itself. Heat treating may effect the crystalline state of the resin to produce a more chemically active surface. It is postulated, for example, that by altering the resin's crystallinity there are more active hydrogen atoms on the surface of the resin. This activated surface may enhance the resin's ability to grab and remove reaction products from the wafer surface.

Photographs made by a scanning electron microscope show the progressive coalescence of a polyurethane resin in a polyester fiber network which has been subjected to heat treating. Photograph 1 shows the unmodified poromeric material produced in the first stage of Example 1 below. Photographs 2, 3, and 4 show progressive stages of coalescence which take place as the material is heated. Photographs 3 and 4 illustrate the approximate upper and lower boundaries of desirable coalescence according to the present invention. Significantly less coalescence than 3 imparts insufficient change to the resin. Significantly more coalescence than 4 reduces the internal surface area to the point where polishing rate is reduced.

As seen in FIG. 1, the untreated resin matrix has a sponge-type structure with many pores and microvoids (which appear as dark areas in the photographs) ranging from very small voids to relatively large pores, openings or channels. As indicated in U.S. Pat. No. 3,067,482, the porous resin matrix has substantially no adhesion to the fibers. As the resin begins melt or flow during the heating or other coalescing treatment, the microvoids begin to disappear and the resin tends to coalesce among and around the fibers so that the larger voids appear to increase in size and number.

Figure 2:
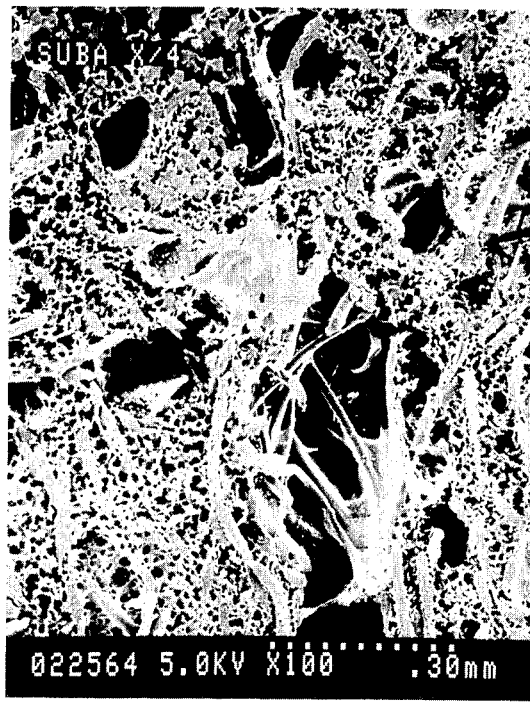
FIGS. 2, 3 and 4 are photographs similar to FIG. 1 but showing progressive stages of modification of the poromeric material according to the coalescence treatment of the present invention.

In the relatively early stage of coalescence shown in FIG. 2, there is still a large number of microvoids and what appears to be a more lace-like matrix of the resin, as shown particularly well in the lower left corner of FIG. 2, while globules of resin are beginning to form as in the upper left hand corner of FIG. 2.

Figure 3:
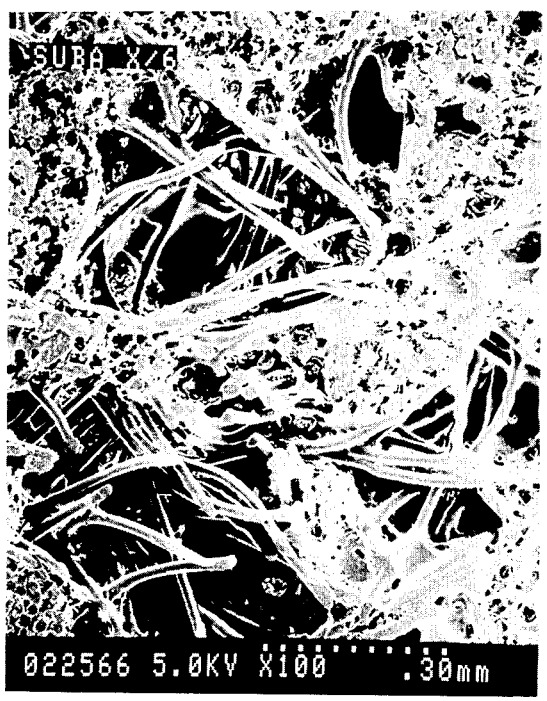

By the time the degree of coalescence has reached the stage of FIG. 3, which represents approximately the lower limit of the degree of coalescence desired according to the present invention, the microvoids have substantially decreased and there is a much larger number of globules of resin. Further, the resin appears to have collapsed around the individual fibers to in effect encase and adhere to the fibers, thereby enhancing the rigidity of the material.

Figure 4:

FIG. 4 represents approximately the upper limit of the degree of coalescence desired according to the present invention. At this stage, the microvoids apparent in FIG. 1 have substantially disappeared, and even many of the spherical globules which predominate in FIG. 3 have run together, forming webs of resin between the fibers of the fibrous network. These webs of resin give the material an almost translucent appearance, and the fibrous network appears to be firmly tied together by the resin, in contrast to FIGS. 1 and 2 where the fibers merely appear to be intermingled with the resin.

In sum, the coalescing treatment step of the invention transforms the porous resin matrix from one with many small microvoids and a high internal surface area to one with fewer but larger microvoids or pores, and necessarily a smaller internal surface area. However, as a result of this transformation, the matrix becomes more porous and harder due to the larger pores and the enhanced rigidity of the fiber network due to the clinging of the resin to the fibers.

In addition to these structural changes in the material, it is believed that chemical changes take place in the crystallinity and surface chemistry of the resin. The nature of these chemical changes is not presently known or understood but the same improvements in polishing properties of the material have not been found to occur with other methods of increasing porosity of the pad material.

The invention will now be illustrated in more detail with reference to the following specific, non-limiting examples.

EXAMPLE 1

A needle punched felted web of polyester fibers was prepared in the manner of Example 1 (col. 3, lines 17-75) of U.S. Pat. No. 3,067,482 except that sufficient fiber was used to produce a web thickness of 0.2 inches. Into this web was impregnated a solution of 80% by weight DMF and 20% by weight Impranil 353 ( a thermoplastic polyester urethane resin manufactured by Mobay Chemical Co.). The impregnated web was then coagulated, washed and dried as described in the referenced patent. The resulting web exhibited a skin of coagulated urethane on its top and bottom surfaces. The web was split into two 0.1 inch thick webs and the skin was removed by skiving so that the physical properties of the interior of the web could be determined. Using a Shore A hardness tester, the hardness was found to be approximately 67 Shore A. Permeability was tested by determining the back pressure required to force 30 ml. per minute of air through three square inches of the material. In the untreated sample as prepared above, backpressure was found to be 350 mm. of water.

After testing, the web was then heat treated by placing it in a hot air oven at 205 degrees C for 3 minutes. Removed from the oven, the web was allowed to cool and again tested. The color had changed from a creamy white to tan. A light skin which had reformed during the heat treating process was removed by sanding. Hardness had increased to 77 Shore A. Backpressure dropped to 50 mm.

The materials of this example, both before and after heat treating, were used to polish silicon wafers. Using a Strasbaugh 6CA polisher, it was found that compared to the untreated pad, wafers polished on the treated pad were flatter and had less edge rounding. The treated pad also tended to produce a somewhat higher rate of stock removal and was somewhat less susceptible to glazing (probably due to its greatly increased porosity).

In repeated attempts to produce the material of the above example, it was found that the optimum heat treating temperature varied according to differences between lots of resin. The following example illustrates an effective means to overcome the critical nature of the heat treating temperature.

EXAMPLE 2

A poromeric web was produced exactly as in Example 1 except that the impregnating solution was as follows:

A 20% solids solution of polyurethane elastomer was prepared as described in Example 1 (col. 4, lines 1-11) of U.S. Pat. No. 3,067,482. Separately, 20 parts by weight of Estane 5707 (a polyurethane resin manufactured by B. F. Goodrich) were dissolved in 80 parts by weight DMF. The impregnating solution was made by mixing 15 parts of the first solution with 83 parts of the second and 2 parts water.

The coagulated web of this example was also split into halves and the skin was removed by skiving. Using a Shore A hardness tester, the hardness was found to be approximately 65 Shore A. Permeability was tested by determining the back pressure required to force 30 ml. per minute of air through three square inches of the material. In the sample of this example, backpressure was found to be 400 mm of water.

After testing, half of the web was then heat treated by passing it over an air knife at 195 degrees C. The web was allowed to cool, sanded and again tested. Hardness had increased to 76 Shore A. Backpressure dropped to 45 mm. The second half of the web was then heat treated in the same manner as the first except that the temperature was raised to 225 degrees C. Except for a slightly darker color on the second half, the physical properties of both treated halves were essentially identical.

Similarly, in polishing tests, both treated halves gave essentially the same results, and both represented an improvement over the untreated material.

Although these examples are based on the use of a solvent-nonsolvent coagulation process to precipitate the resin within the fiber network, other mechanisms can be used to precipitate the resin. Some other common methods well known in the manufacture of poromerics and reinforced non-wovens include impregnating with resin latices and foams. Latices are typically impregnated into the web, and then the suspension is destabilized by heat, salt, or pH to effect precipitation and coagulation of the resin in situ. Foam systems work by mechanically forcing a foam into the web (as by passing a foam covered web between two nip rollers). Either of these techniques will produce a satisfactory starting poromeric for this invention providing the melting points of the resins have been chosen as described herein.

The present invention may be embodied in other specific forms without departing from the spirit or essential attributes thereof and, accordingly, reference should be made to the appended claims, rather than to the foregoing specification, as indicating the scope of the invention.

We claim:

1. A poromeric pad material comprising a porous thermoplastic resin matrix reinforced with a fiber network, said resin matrix being coalesced among the fibers to increase the porosity and hardness of the material, wherein said resin matrix comprises a blend of at least two resins, one of said resins having a melting point higher than the other, whereby said higher melting point resin is not substantially coalesced.

2. A material according to claim 1 wherein at least one said resin has a melting point lower than the softening point of the fibers of said fiber network.

3. A material according to claim 1 wherein said fiber network comprises polyester fibers.

4. A material according to claim 1 wherein at least one said resin is selected from the group consisting of polyurethane, formalized polyvinyl alcohol, polycarbonate and polyureas.

5. A material according to claim 1 wherein at least one said fiber network comprises felted polyester fibers and said resin comprises polyurethane.

6. A material according to claim 1 wherein a polishing aid is incorporated into said resin matrix before coalescense of said one resin.

7. A material according to claim 6 wherein said polishing aid comprises a particulate abrasive.

8. A material according to claim 7 wherein said particulate abrasive is selected from the group consisting of silica, cerium oxide, titanium dioxide, silicon carbide and diamond.

9. A method for producing a poromeric polishing pad material comprising forming a thermoplastic resin matrix within a fiber network so as to leave pores in the resin matrix and treating said resin matrix to cause it to coalesce among the fibers to increase the porosity and hardness of the material, wherein said resin matrix comprises a blend of at least two resins, one of said resins having a melting point higher than the other and wherein said treatment step comprises heating said resins to a temperature and for a time sufficient to coalesce the lower melting point resin, but insufficient to substantially coalesce the higher melting point resin.

10. A method according to claim 9 wherein at least one matrix is formed by precipitating the resin from solution by a solvent-nonsolvent coagulation process.

11. A method according to claim 9 wherein at least one said resin contains an additive which has the effect of modifying the resin melting point.

12. A method according to claim 11 wherein said additive comprises a plasticizer or solvent for said at least one resin.

13. A method according to claim 10 wherein at least one said resin contains a solvent for the resin which is non-miscible with the nonsolvent coagulator.

14. A method according to claim 9 wherein a polishing aid is impregnated into said material after formation of said matrix but prior to coalescence of said one resin.

15. A polishing pad material produced according to the method of claim 10.

16. A polishing pad material produced according to the method of claim 9.

17. A polishing pad material produced according to the method of claim 11.

18. A method according to claim 9 wherein said temperature is insufficient to substantially soften said fibers, and the duration of said treatment is sufficient to decrease the number of microvoids in the resin matrix.

19. A method according to claim 9 wherein the melting points of said lower melting point resin and said higher melting point resin are at least 10° C. apart.

* * * * *